June 30, 1959 — J. LYNN — 2,892,719

SANDWICH HOLDER

Filed Sept. 21, 1956

INVENTOR
John Lynn

BY *Lancaster, Allwine & Rommel*
ATTORNEYS

United States Patent Office 2,892,719
Patented June 30, 1959

2,892,719

SANDWICH HOLDER

John Lynn, Alice, Tex.

Application September 21, 1956, Serial No. 611,181

6 Claims. (Cl. 99—88)

This invention relates to improvements in an edible holder for supporting a sandwich in such manner that a portion of the sandwich protrudes therefrom to facilitate eating thereof.

The primary object of this invention is the provision of an edible container or holder for supporting a food product, such as a sandwich, in a secure, sanitary and clean manner, adjustable to size of the food product so that juices and fragments of the filler of the sandwich will not drip or fall into the hand of the person eating the sandwich.

A further object of this invention is the provision of an edible container or holder for sandwiches which is vertically adjustable to suit the thickness of the sandwich, and the parts of which are so shaped that they can be nested for compact storage.

A further object of this invention is the provision of an adjustable container or holder, preferably edible, for food products such as hamburger sandwiches and the like, arranged so that a major portion of the sandwich can protrude therefrom for eating under such circumstances that grease, butter and fragments of the filler cannot drop into the hand of the person eating the sandwich.

Other objects and advantages of this invention will be apparent during the course of the following detailed description.

In the accompanying drawing, forming a part of this specification and wherein similar reference characters designate corresponding parts throughout the several views.

Figure 1:
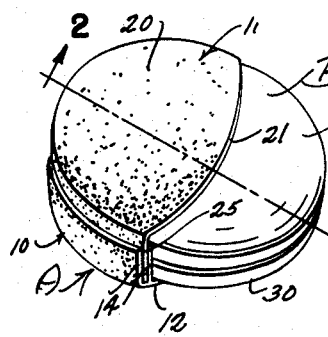
Figure 1 is a perspective view showing the improved holder with a sandwich supported therein.

In the drawing wherein for the purpose of illustration is shown only a preferred embodiment of the invention, the letter A may generally designate the edible holder which is adapted to support some food product such as the sandwich B. It is preferred that the container or holder be made of some edible material, shortened dough or the like, in the nature of pie crust, and the same may be stiff or slightly flexible, and absorbent if so desired.

The holder A preferably comprises a base or female portion 10 and a cover, lid or male portion 11. The shapes of the portions 10 and 11 preferably suit the contour and shape characteristics of the food product B. Since most hamburger sandwiches are of the disc shaped bun type, the shape of the parts of the holder conform thereto so as to provide close fitting surfacing to engage the socketed portion of the sandwich.

It is well known that sandwiches in which the meat portion is unusually thick or in which relishes and other fillers are provided very often permits the filling to drop into the hand of the user, and very often fat, butter and gravy drippings will soil the hands of the user.

Figure 2:
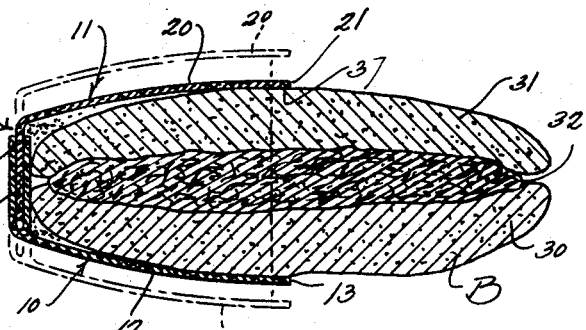
Figure 2 is a cross sectional view taken through the holder and sandwich substantially on the line 2—2 of Figure 1, and showing in dot and dash lines the adjustability of parts of the holder to suit the thickness of the sandwich.
Figure 3:
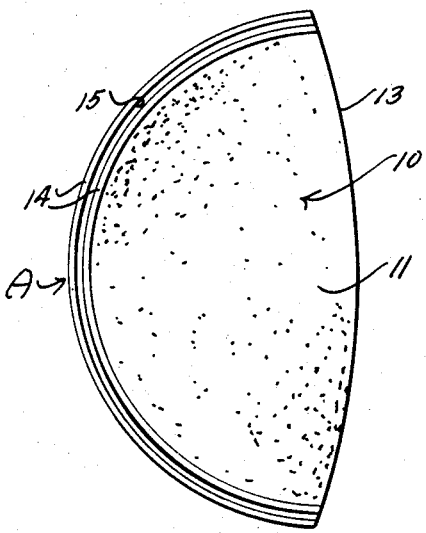
Figure 3 is a top plan view of the base or female portion of the holder.
Figure 4:
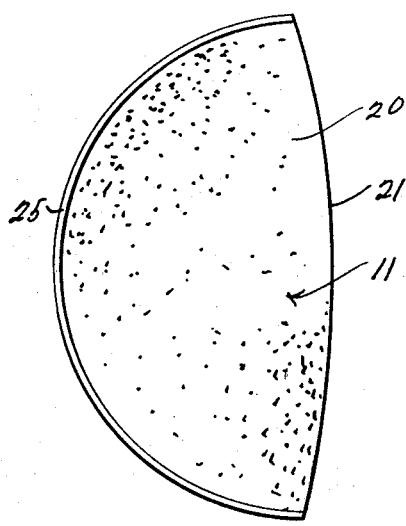
Figure 4 is a bottom plan view of the lid or male portion of the holder.

Referring to the base portion 10, the same preferably comprises a base wall 12 which in plan view is segmental, as shown in Figure 3. The front edge 13 is convexed. Upstanding relatively spaced arcuate walls 14 are provided upon a margin of the base wall 12, preferably struck from what would ordinarily be the center of the bun, and defining a channel 15 for receiving a similar wall of the lid or cover 11. The wall 12 is concavo-convexed in cross section both from rear to the opened edge 13, as shown in Figure 2, and also in a plane at right angles thereto.

The lid or cover 11 is provided with a top wall 20 the curvature of which may conform to the curvature of the base wall 12. The wall 20 in plan appearance is segmental, and it has an edge 21 which is convexed. The wall 20 is upwardly concavo-convexed in cross section both from front to rear and laterally in a plane at right angles thereto. It is provided along a marginal edge with an arcuate transversely extending wall 25 struck from the same radial center as the walls 14 of the base section 10 and adapted to be snugly and telescopically received in the channel 15.

The sandwich B is usually of the bun type, including lower and upper bun layers 30 and 31 and filling 32.

Figure 7:
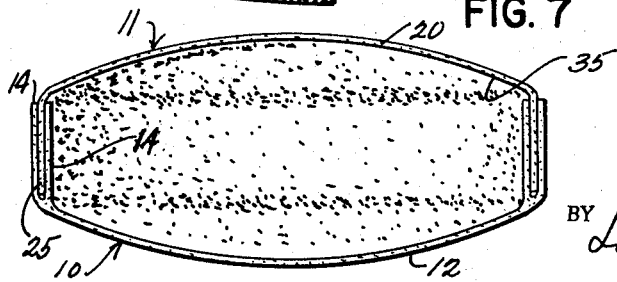
Figure 7 is a front view of the holder showing the opened side of the holder; the parts being assembled without a sandwich supported therein.

The parts 10 and 11 when assembled appear as shown in the front view of Figure 7 showing a compartment 35 which from side to side of the holder A has a variable thickness increasing from the sides toward the medial center thereof. As shown in the front to rear section Figure 2 the walls 12 and 20 shape the compartment 35 so that it varies from its most restricted height adjacent the marginal walls 14 and 25 to the opening of the chamber 35 which has been indicated at 37 in Figure 2.

It is within contemplation of this invention to shape the holder to conform to square or rectangular shaped sandwiches. In any event, the holder is so designed that the sandwich B protrudes from the opening 37 for at least half and possibly the major portion thereof, as shown in Figures 1 and 2, so that the user can consume the projected portion without eating the holder if such is not desired. Since the sections 10 and 11 are vertically adjustable, they will obviously hold sandwiches of a wide range of thicknesses. Also because of this adjustability and the fact that the adjustment can be made without fragments of the sandwich or drippings falling into the hand of the user, it is possible after consuming the projected portions of the sandwich B to slightly separate the hold sections 10 and 11 and re-arrange the remaining portion of the sandwich so that it may be eaten without the necessity of consuming any part of the edible holder if such is not desired. On the other hand, it is possible, because the holder parts are made of edible material, to consume both the sandwich and the holder with the assurance that the holder will provide means to prevent juices and fragments of the sandwich from dropping into the user's hand.

Figure 5:
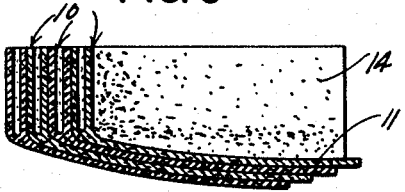
Figure 5 is a cross sectional view taken from front to rear through a nested arrangement of the base parts of the holder, showing the compactness with which the same may be stored.
Figure 6:
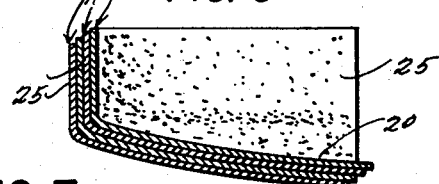
Figure 6 is a cross sectional view taken through a nested arranged of the lid or top cover portions of the holder, likewise showing the compactness with which they may be arranged for storage purposes.

It will be noted from Figures 5 and 6 that the portions of the holder can be compactly nested. Thus, a large number of the same can be stored in a small space either for shipping or dispensing purposes. The holder is a very low cost item.

Various changes in the shape, size and arrangement of parts may be made to the form of invention herein shown and described, without departing from the spirit of the invention or scope of the claims.

I claim:

1. As an article of manufacture an edible sandwich holder adapted to receive bun type sandwiches comprising a base section including a bottom wall which is convexed in all planes of cross section, said bottom wall being of segmental plan shape and having at an outer marginal portion thereof an upstanding arcuate retaining wall terminating at its ends to define an opened side opposite the retaining wall, and a lid section comprising a cover wall convexly shaped in all transverse planes of intersection, said lid section including an arcuate depending retaining wall adapted to engage and telescope with the upstanding retaining wall of the base section, the depending wall of the lid section terminating at its ends to define an opening, said base and lid portions when interfitted defining a chamber having a sandwich receiving opening at said opened sides of both sections of substantial width exposed thereupon.

2. As an article of manufacture an edible sandwich holder adapted to receive therebetween a conventional sandwich so that a large portion of the sandwich protrudes therefrom comprising a pair of edible sections one of which has a top wall and the other a bottom wall and each of which have marginal transversely extending side wall portions, one side wall portion of one section being double walled to provide a recess into which the marginal side wall of the other section is adapted to adjustably interfit to telescopically dispose said sections whereby the top and bottom wall portions may be relatively spaced according to the thickness of the sandwich being received therebetween without the marginal side walls separating, the marginal side wall portions each terminating to define a large lateral opening to said holder through which a sandwich is adapted to protrude for eating.

3. An edible sandwich holder as defined in claim 2 in which the top and bottom walls are relatively concavo-convex with relative divergence from the side marginal walls towards the lateral opening and in which the marginal side walls are arcuately shaped to conform to the curvature of that portion of the sandwich which is adapted to be received within the holder.

4. As an article of manufacture an edible sandwich holder comprising vertically adjustable telescopic sections defining a chamber therebetween for receiving a sandwich and each having a lateral opening through which is adapted to protrude a portion of the sandwich, said sandwich holders being generally of substantially the same shape and each including an outer wall which are spaced to provide top and bottom walls when the sections are telescoped together, surrounded by telescoping side walls, said side walls terminating at the front margins of the outer walls of the sections to define said sandwich opening.

5. A sandwich holder as defined in claim 4 in which the outer walls are outwardly concavo-convexly formed and in which the marginal walls are arcuately formed in the plane of the holder.

6. As an article of manufacture an edible sandwich comprising an edible sandwich body having a holder encasing a substantial portion thereof, said holder comprising a pair of height adjustable telescopic edible sections each including an outer wall and which walls are adapted to fit over the top and bottom of the sandwich body, and telescopically associated side walls which surround only a portion of the sandwich body and which terminate short of the front margins of the outer walls to define an opening from which the sandwich body protrudes.

References Cited in the file of this patent

UNITED STATES PATENTS

| Number | Name | Date |
|---|---|---|
| 428,502 | Maggi | May 20, 1890 |
| 1,240,235 | Mathison | Sept. 18, 1917 |
| 1,529,670 | Pritchard et al. | Mar. 17, 1925 |
| 1,552,671 | Bellocchio | Sept. 8, 1925 |
| 1,569,121 | Hall | Jan. 12, 1926 |
| 1,715,857 | Meyer | June 4, 1929 |
| 2,060,490 | Borbely | Nov. 10, 1936 |
| 2,120,710 | Nieding | June 14, 1938 |
| 2,358,598 | Scherer | Sept. 19, 1944 |
| 2,452,174 | Arnold | Oct. 26, 1948 |
| 2,492,832 | Barasch | Dec. 27, 1949 |